(12) United States Patent
Chiueh et al.

(10) Patent No.: US 9,483,469 B1
(45) Date of Patent: Nov. 1, 2016

(54) TECHNIQUES FOR OPTIMIZING DISK ACCESS

(75) Inventors: Tzi-cker Chiueh, Setauket, NY (US);
Fanglu Guo, Los Angeles, CA (US);
Nitin Suresh Supekar, Pune (IN);
Gaurav Makin, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 1013 days.

(21) Appl. No.: 12/495,141

(22) Filed: Jun. 30, 2009

Related U.S. Application Data

(63) Continuation-in-part of application No. 12/059,985, filed on Mar. 31, 2008, now abandoned.

(51) Int. Cl.
*G06F 12/00* (2006.01)
*G06F 17/30* (2006.01)

(52) U.S. Cl.
CPC ............... *G06F 17/30005* (2013.01)

(58) Field of Classification Search
CPC .......... G06F 17/30097; G06F 17/30286; G06F 17/30306; G06F 17/30321; G06F 17/30445; G06F 17/30501; G06F 17/30595; G06F 9/465; G06F 12/0871
See application file for complete search history.

(56) References Cited

U.S. PATENT DOCUMENTS

| | | | |
|---|---|---|---|
| 5,764,972 A * | 6/1998 | Crouse et al. | |
| 6,535,869 B1 * | 3/2003 | Housel, III | 707/691 |
| 6,571,261 B1 * | 5/2003 | Wang-Knop et al. | |
| 7,447,836 B2 * | 11/2008 | Zhang et al. | 711/113 |
| 2003/0065688 A1 * | 4/2003 | Dageville | G06F 17/30306 |
| 2004/0153720 A1 * | 8/2004 | Lee | 714/5 |
| 2005/0195660 A1 * | 9/2005 | Kavuri et al. | 365/189.05 |
| 2006/0190938 A1 * | 8/2006 | Capek et al. | 717/161 |
| 2006/0272021 A1 * | 11/2006 | Marinescu | G06F 21/56 726/24 |

OTHER PUBLICATIONS

"File Allocation Table" Wikipedia.org as pulled from Wikipedia history Mar. 30, 2007.*
"Defragmentation" Wikipedia.org as pulled from Wikipedia history Mar. 22, 2007.*
Veritas; "Part of the Veritas Vertex Initiative", Veritas NetBackup FlashBackup for Lightning-Fast Backups of Large File Servers; 11 pages; 2001.

* cited by examiner

*Primary Examiner* — Angelica Ruiz
(74) *Attorney, Agent, or Firm* — Wilmer Cutler Pickering Hale and Dorr LLP (57) ABSTRACT

Techniques for optimizing disk access are disclosed. In one particular exemplary embodiment, the techniques may be realized as a system for optimizing disk access comprising a module for reading files in a filesystem, the files comprising one or more file fragments, a module for determining a relative location of the one or more file fragments on a disk, a module for sorting an index of the one or more file fragments on the disk in one or more fragment tables according to the relative location of the one or more file fragments on the disk, a module for reading the one or more file fragments from the disk, a module for assembling one or more of the files from the one or more file fragments.

19 Claims, 7 Drawing Sheets

TECHNIQUES FOR OPTIMIZING DISK ACCESS

CROSS REFERENCE OF RELATED APPLICATIONS

This application is a continuation-in-part of U.S. patent application Ser. No. 12/059,985, filed Mar. 31, 2008, which is hereby incorporated by reference in its entirety.

FIELD OF THE DISCLOSURE

The present disclosure relates generally to accessing disk files and, more particularly, to techniques for optimizing disk access.

BACKGROUND OF THE DISCLOSURE

In conventional computer systems, a computer application may request a file and an operating system and/or a disk or hardware controller may be operable to retrieve the file from a disk. Scenarios exist where all or most of the files on a disk are accessed. Examples where most or all files in a filesystem are accessed include an anti-virus scan where most or all files on a filesystem may be analyzed for virus infection, or a backup procedure where most or all files on a disk are copied to another disk or other medium. In these scenarios, most or all of the files are accessed. In most cases, the filesystem is traversed sequentially, and access is done without knowledge of a physical location of the files on the disk. This sequential traversal may unnecessarily prolong the process, as significant delay may be added by rearranging a read/write mechanism of the disk to read files that are fragmented or are logically out of order. Seek times for disk drives, especially spinning platter magnetic drives, are orders of magnitude larger than many other types of memory access or the processing capabilities of modern processors.

In view of the foregoing, it may be understood that there are significant problems and shortcomings associated with current disk access technologies.

SUMMARY OF THE DISCLOSURE

Techniques for optimizing disk access are disclosed. In one particular exemplary embodiment, the techniques may be realized as a system for optimizing disk access comprising a module for reading files in a filesystem, the files comprising one or more file fragments, a module for determining a relative location of the one or more file fragments on a disk, a module for sorting an index of the one or more file fragments on the disk in one or more fragment tables according to the relative location of the one or more file fragments on the disk, a module for reading the one or more file fragments from the disk, a module for assembling one or more of the files from the one or more file fragments.

In accordance with other aspects of this particular exemplary embodiment, the disk comprises a single physical disk.

In accordance with further aspects of this particular exemplary embodiment, the disk comprises more than one physical disk.

In accordance with additional aspects of this particular exemplary embodiment, the size of the one or more fragment tables is variable.

In accordance with other aspects of this particular exemplary embodiment, the size of the one or more fragment tables is fixed.

In accordance with further aspects of this particular exemplary embodiment, the one or more fragment tables are populated with a list of one or more of the files that are smaller than a defined size.

In another particular exemplary embodiment, the techniques may be realized as a method for optimizing disk access comprising the steps of reading files in a filesystem, the files comprising one or more file fragments, determining a relative location of the one or more file fragments on a disk, storing the one or more file fragments on the disk in one or more fragment tables, reading the one or more file fragments from the disk, and assembling one or more of the files from the one or more file fragments.

In accordance with other aspects of this particular exemplary embodiment, the disk comprises a single physical disk.

In accordance with further aspects of this particular exemplary embodiment, the disk comprises more than one physical disk.

In accordance with additional aspects of this particular exemplary embodiment, the size of the one or more fragment tables is variable.

In accordance with other aspects of this particular exemplary embodiment, the size of the one or more fragment tables is fixed.

In accordance with further aspects of this particular exemplary embodiment, the one or more fragment tables are populated with a list of one or more of the files that are smaller than a defined size.

In accordance with other aspects of this particular exemplary embodiment, at least one processor readable carrier for storing a computer program of instructions configured to be readable by at least one processor for instructing the at least one processor to execute a computer process for performing the method is provided.

In another particular exemplary embodiment, the techniques may be realized as an article of manufacture for optimizing disk access, the article of manufacture comprising at least one processor readable carrier, and instructions carried on the at least one carrier, wherein the instructions are configured to be readable from the at least one carrier by at least one processor and thereby cause the at least one processor to operate so as to read files in a filesystem, the files comprising one or more file fragments, determine a relative location of the one or more file fragments on a disk, sort an index of the one or more file fragments on the disk in one or more fragment tables according to the relative location of the one or more file fragments on the disk, read the one or more file fragments from the disk, and assemble one or more of the files from the one or more file fragments.

In another particular exemplary embodiment, the techniques may be realized as a method for optimizing disk access comprising the steps of reading file identifiers in a master table, the file identifiers associated with one or more files, reading files in a filesystem, the files comprising one or more file fragments and associated with the file identifiers, determining a relative location of the one or more file fragments on a disk, storing the one or more file fragments on the disk in one or more fragment tables, reading the one or more file fragments from the disk, and assembling one or more of the files from the one or more file fragments.

In accordance with further aspects of this particular exemplary embodiment, the method further comprises a volume cache driver to receive read/write requests.

In accordance with further aspects of this particular exemplary embodiment, the volume cache driver caches the one or more file fragments in a cache.

In accordance with further aspects of this particular exemplary embodiment, the volume cache driver removes the one or more files from the cache after it is transmitted to an application.

In another particular exemplary embodiment, the techniques may be realized as a method for optimizing disk access comprising the steps of reading segments in a filesystem, the segments comprising one or more subsegments, determining a relative location of the one or more subsegments on a disk, storing the one or more subsegments on the disk in one or more fragment tables, assembling one or more segments from the one or more subsegments, transmitting a digest of the one or more segments to a system, and transmitting the one or more segments based on an evaluation of the digest.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
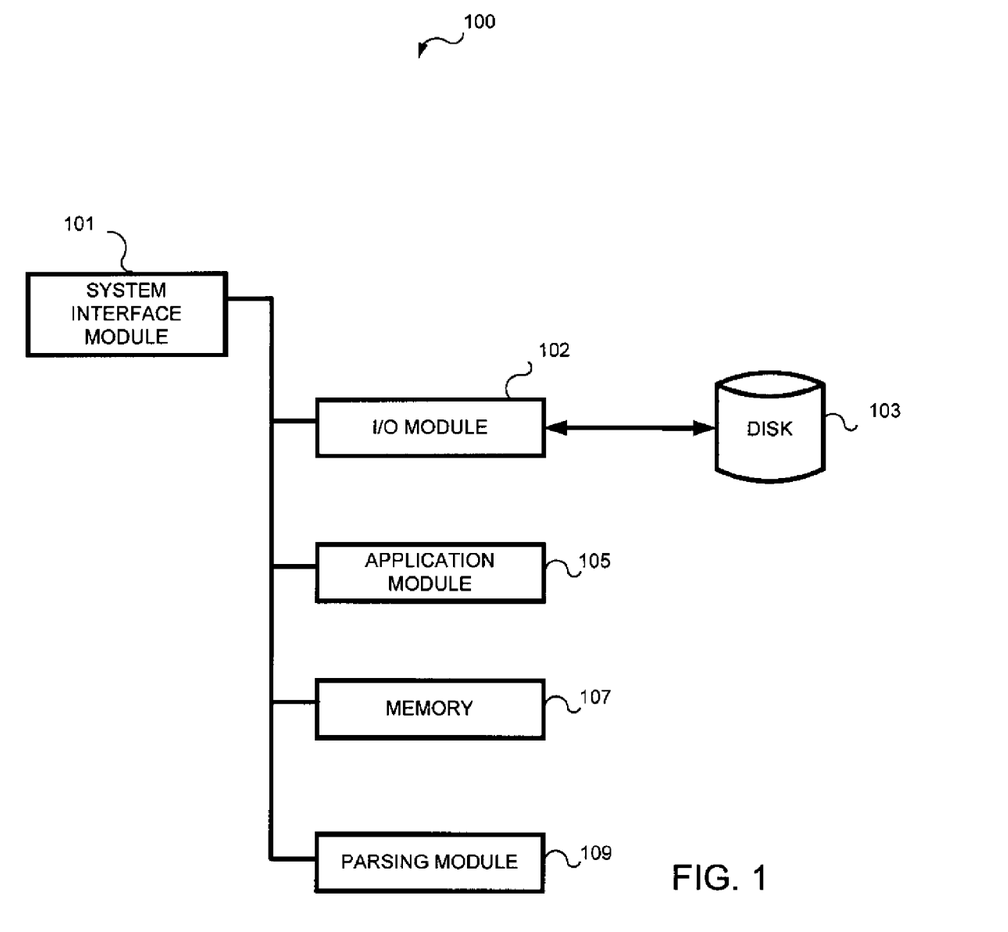
FIG. 1 shows a system level diagram in accordance with an embodiment of the present disclosure.

Referring to FIG. 1, a diagram level overview of a system 100 is shown in accordance with an embodiment of the present disclosure. The system 100 may comprise a system interface module 101, an input/output ("I/O") module 102, an application module 105, memory 107, and a parsing module 109. Each module will be explained in more detail below. Each module may interact with each other module. In one embodiment, the modules may be contained within one physical system, but this is not necessary. In another embodiment, one or more modules may be placed on one or more physical systems, for example on one or more computers. The one or more computers, and the one or more modules which may reside on the one or more computers, may be in communication via a network.

The system interface module 101 may be operable to permit or allow some or all of the other modules to interact with one another. The interaction may allow one or more of the modules to transmit signals to another one or more of the modules, or the system interface module 101 may selectively permit signals to be transmitted between one or more modules. The signals may constitute packets of data, or other types of signals transmitted between one or more modules and one or more other modules. The system interface module 101 may be in communication with a network, not shown.

Such a network may include, but is not limited to, for example, a wide area network ("WAN"), a local area network ("LAN"), a global network such as the Internet, a telephone network such as a public switch telephone network, a wireless communication network, a cellular network, an intranet, or the like, or any combination thereof. Also, such a network may be used so that components of the present disclosure may be in communication with one another. In exemplary embodiments of the present disclosure, such a network may include one or any number of the exemplary types of networks mentioned above operating as a stand-alone network or in cooperation with each other. Use of the term network herein is not intended to limit such a network to a single network.

The I/O module 102 may be operable to read input from one or more input devices and write output to one or more output devices. The I/O module 102 may be in communication with memory 107 or a disk 103 associated with the system 100, and may be in communication with the parsing module 109 and/or the application module 105, so that files or file fragments read by the system may be communicated to the memory 107, application module 105, parsing module 109, or other modules associated with the system 100.

The disk 103 may be operable to store one or more files. The disk 103 may comprise a magnetic disk drive, a tape drive, a RAM drive, a solid state drive, or other hardware capable of storing and recalling files. The disk 103 may also comprise a filesystem, in which files which are stored on the disk 103 may be indexed. The filesystem may store files as blocks of data, and the data may not be continuously stored on the disk 103. For example, a first portion of a file may be stored in a first area of the disk 103, and a second portion of a file may be stored in a second area of the disk 103, so that the first area and the second area do not physically abut. Of course, the disk 103 need not be a physical spinning platter of magnetic media in order to store one or more files in one or more fragments.

The application module 105 may be operable to utilize complete files. For example, the application module 105 may comprise anti-virus software operable to take complete files and analyze them for virus infection. The application module 105 may also comprise backup software operable to create a copy of complete files on a backup system. The application module 105 may contain other software, which may access files.

The memory 107 may be associated with the system 100 or a computer on which the system 100 operates. The memory 107 may also be dedicated to the system 100. The memory 107 may comprise random access memory ("RAM"), or any other type of memory capable of storing and recalling data.

The parsing module 109 may be operable to create one or more fragment tables, and may be operable to populate the one or more fragment tables with data from the disk 103 and/or the memory 107. The parsing module 109 may transmit complete files to the application module 105. The parsing module 109 may be in communication with the I/O module 102, the application module 105, the memory 107, and/or the disk 103.

Figure 2:
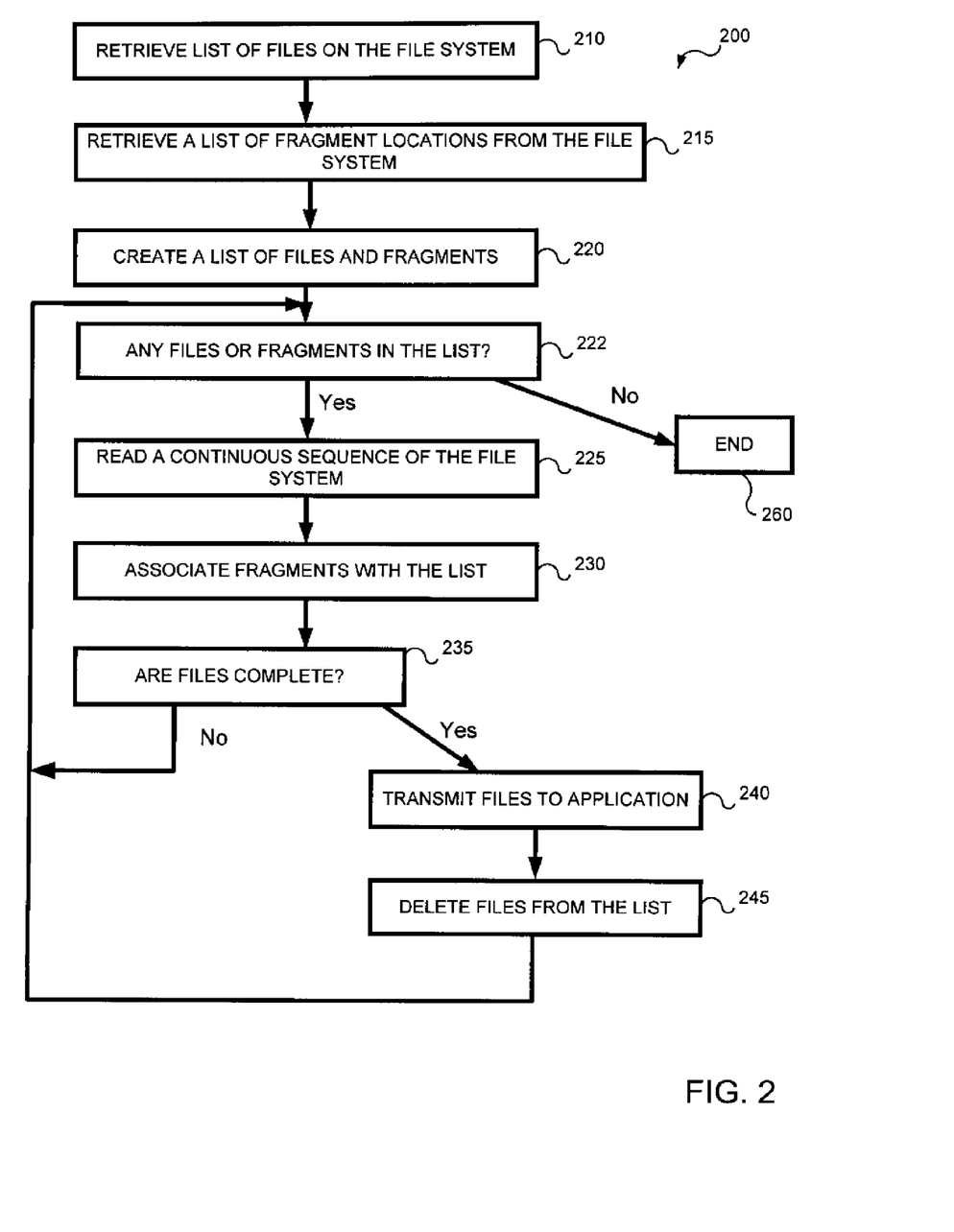
FIG. 2 shows a flow chart of a method for improved disk access in accordance with an embodiment of the present disclosure.

Turning now to FIG. 2, a flow chart of a method 200 for optimizing disk access is shown in accordance with an embodiment of the present disclosure. In step 210, a system is operable to read a filesystem from a disk. Methods of reading the filesystem from the disk may vary depending on a type of disk and a file structure that the disk utilizes to store and recall files. In a New Technology File System ("NTFS")-formatted disk running Microsoft WINDOWS, for example, a list of files stored on the disk may be stored in a master file table. The system may be operable to, for example, read the master file table directly in order to discover all of the files on the disk. In some embodiments, the system may parse the filesystem and may skip files that are larger than a specified size. The specified size may be provided by an application or may be provided by a user. The specified size may be dynamic, depending on needs and capabilities of the system. Alternatively, the system may parse files and directories to find all files in a filesystem.

In step 215, the system may retrieve a list of file fragments. In an NTFS-formatted disk, for example, the system may retrieve the list of file fragments from the master file table, and may retrieve the list of file fragments at the same time as the retrieval of the filesystem information in step 210. Alternatively, the system may utilize other software to determine a location of file fragments on the disk.

In step 220, the system may use the list of files stored on the disk and the location of file fragments to assemble a fragment table. The fragment table may sort the fragments based on their relative position, so that they are in an order relative to their disk location, and may include a pointer or other indexing system to relate the file fragments to the associated file. For example, the list of file fragments may enable the system to assemble a maximum number of files with a minimum of noncontinuous disk accesses. The fragment table may selectively list files which are below a certain size, or may list all files in the filesystem. Additionally, the fragment table may be a fixed size, or may be a variable size in order to accommodate the number of files in the filesystem.

In step 222, the system may parse the fragment table to determine if any files and/or file fragments exist in the fragment table. If no files or file fragments exist, the method may end at step 260.

If files or file fragments exist in the fragment table, then the method 200 may proceed to step 225 wherein a continuous sequence of the disk may be read. A continuous sequence of a disk may be, using a rotating magnetic platter disk drive as an example, a single radius of the disk, or an area of the disk so that the reading device does not skip, but instead moves a minimum amount in order to find the next track of data. The system may start a process of reading from the disk at any position on the disk. The system, for example, may start at a first sector available on the disk, a last sector available on the disk, or at another point where the system determines that reading continuous areas of the disk may maximize assembly of files, or may be advantageous in any other way. An amount of data read from the disk may be a fixed amount of data set by software, hardware, or a user, or such amount may change from one iteration to the next. The amount of data read from the disk may also depend on an amount of memory available on the system.

In step 230, data contained within the file fragments in the continuous sequence of the disk may be associated with a file fragment in the fragment table.

In step 235, after a file fragment is added to the fragment table, the system may analyze the file associated with the added file fragment to see if the file is complete. If the file is not complete in the fragment table, the system may begin again at step 222 to associate another file fragment or file fragments with the fragment table. However, in step 240, if the file is complete in the fragment table, the system may transmit the file to an application requesting the file. For example, the system may transmit the file to an anti-virus software or other software for further analysis, or may transmit the file to backup software for storage on a backup system.

In step 245, the system then may delete the file from the fragment table. The system may create an entry in the fragment table that the file has been transmitted, or the file and associated metadata may be deleted from the fragment table. The system may associate all file fragments read in a continuous access of a disk into the fragment table before determining if any of the files associated with the file fragments are complete.

In other embodiments, the system may associate one or more file fragments at a time into the fragment table, and determine if the files associated with the one or more file fragments are complete. The system may then move the completed files to the application. The system may utilize either method, depending on time, memory availability, or other factors.

Figure 3:
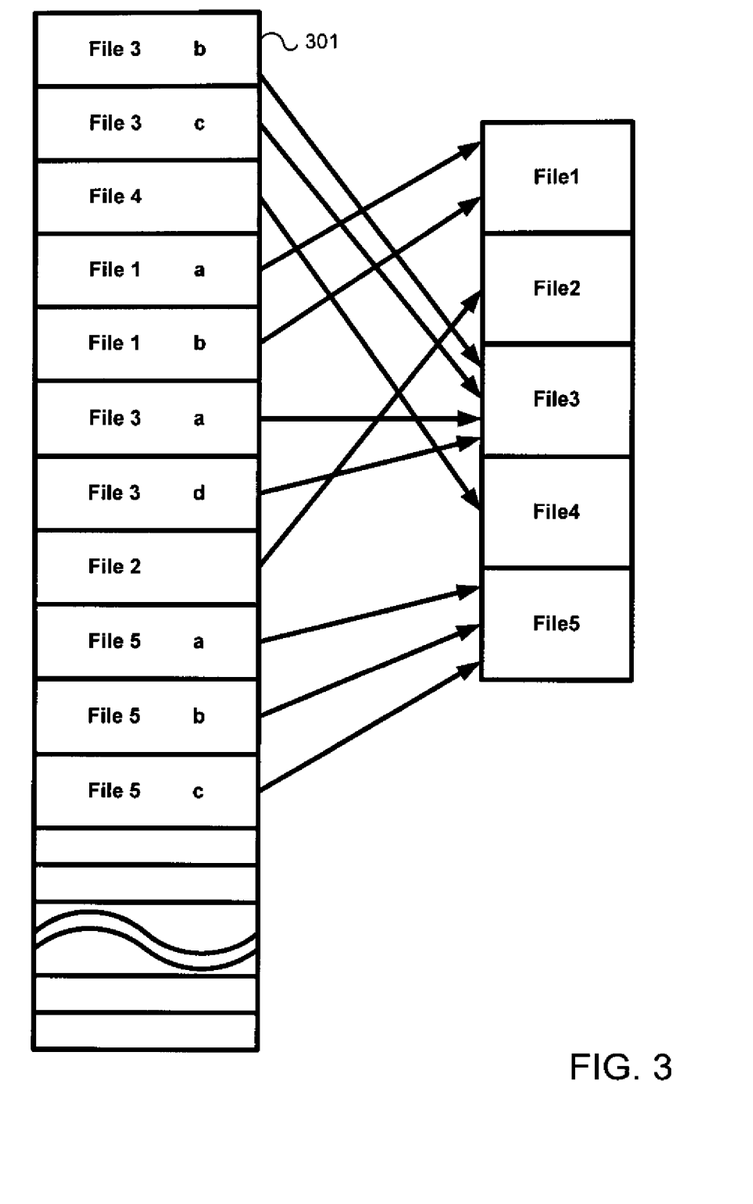
FIG. 3 shows an initial exemplary fragment table in accordance with an embodiment of the present disclosure.
Figure 4:
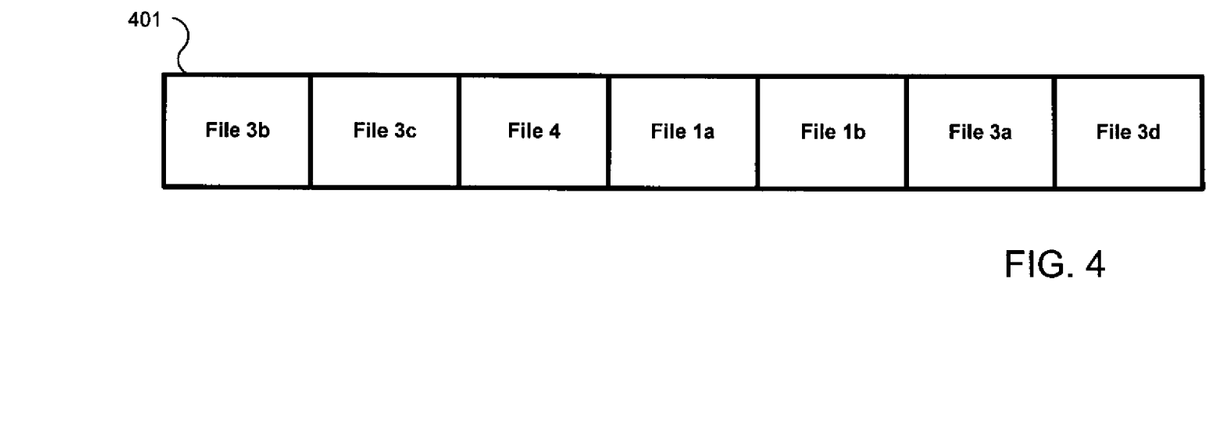
FIG. 4 shows an exemplary region of a physical disk in accordance with an embodiment of the present disclosure.
Figure 5:
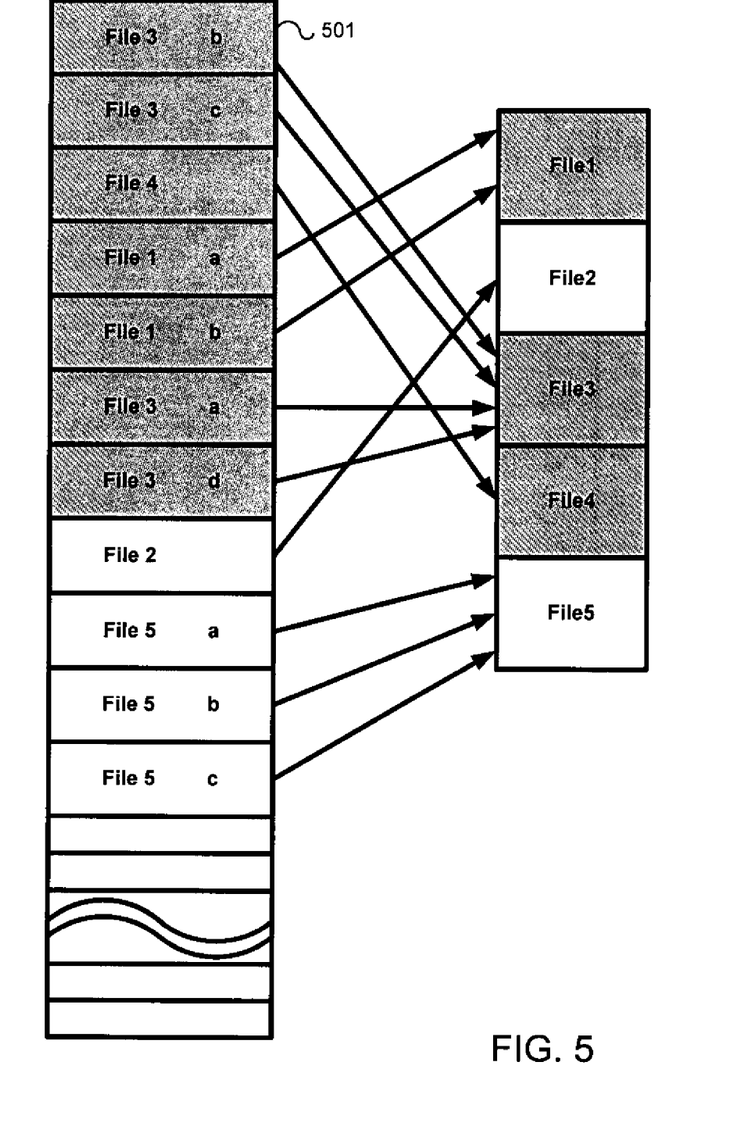
FIG. 5 shows an exemplary fragment table after the application of the fragments shown in FIG. 4 in accordance with an embodiment of the present disclosure.

Turning now to FIGS. 3, 4, and 5, an example of the method 200 of FIG. 2 is shown according to one embodiment of the present disclosure. The example shown in the following Figures is exemplary only and is meant to illustrate one possible embodiment of the present disclosure.

Turning specifically to FIG. 3, an initial exemplary fragment table 301 is shown in accordance with an embodiment of the present disclosure. The system may, for example, create a fragment table 301 according to steps 210 through 220 in FIG. 2. The system may read a filesystem of a disk and determine that, in the present example, five files exist within the filesystem. The names of the files are "file1," "file2," "file3," "file4," and "file5." The system may then read fragment information associated with the disk, and may determine that file1 exists in two fragments, file2 exists in a single fragment, file3 exists in four fragments, file4 exists in a single fragment, and file5 exists in three fragments. The file fragment information may also indicate that all of the fragments for file1, file3, and file4 exist within close proximity to one another. The system may use this information to order the fragment table 301 so that the fragments are in a similar order as found on the disk. The system may also create links between the file fragments and the file that the file fragment is a part of. For example, the system may create a link between file fragment file3a and file file3. The system may create a link between file fragment file3b and file file3. The system may create a link between some or all of the file fragments and the file the file fragment is a part of in this way.

Turning specifically to FIG. 4, an exemplary region 401 of a physical disk is shown in accordance with an embodiment of the present disclosure. In this example, the system may choose to begin at this region 401 of the disk. The system may read all files from the region 401 into a temporary memory buffer. The system may associate file fragment file3b with file3 in the fragment table 301 according to the link between file fragment file3b and file file3 in the fragment table 301, and may also associate file fragment file3c with file3 in the fragment table 301. Next, the system may associate the file fragment file4 with file4 in the fragment table 301 according to the link in the fragment table 301. Recognizing that file4 is now complete, the system may transmit file4 to an application, and may remove file4 from the fragment table 301. The system may then associate file fragment 1*a* with file1 in the fragment table 301 according to the link in the fragment table 301, and may then associate file fragment file1b with file1 in the fragment table 301 according to the link in the fragment table 301.

Recognizing that file1 is now complete, the system may transmit file1 to the application, and may remove file1 from the fragment table 301. The system may then associate file fragment file3a with file3 in the fragment table 301 according to the link in the fragment table 301, and may then associate file fragment file3d with file3 in the fragment table 301 according to the link in the fragment table 301. Recognizing that file3 is now complete, the system may transmit file3 to the application, and may remove file3 from the fragment table 301.

Turning specifically to FIG. 5, an exemplary fragment table 501 after the association of the fragments shown in FIG. 4 is shown in accordance with an embodiment of the present disclosure. The shaded files indicate files that were completed and were transmitted to the application and removed from the fragment table 501. File2 and file5 remain in the fragment table 501, and the system may read another continuous section of the disk in order to assemble filet and file5 so that the files may be transmitted to the application. When all files in the fragment table 501 have been transmitted to the application, no files may remain in the fragment table 501, and the system may note that all files have been transmitted to the application.

In other embodiments, it may be advantageous to allow access to a file system. For example, a system having an encrypted and/or compressed disk may not have content (i.e., files or a file system) that is directly readable (i.e., a command to read or write a file may access an operating system and/or file system to make a request, and the operating system and/or file system may decrypt or decompress a block or blocks associated with the file in question). A cache driver or volume cache driver may intercept read and/or write requests from an application on a system that wishes to access one or more files of the file system. A file may be opened by a file identifier, instead of by a file path, which may be stored randomly on a disk. Also, metadata associated with files on the disk may be cached to avoid re-reading the metadata from the disk. Further, file fragments associated with a target file may be cached until some or all of the file fragments may be located and the file may be assembled. The cache driver may present the file to the application that requested the file. The cache driver may thus be between the application that requests one or more files and the file system, and may operate with the file system to process the fragments, which may exist on the disk as encrypted and/or compressed. The cache driver may cache the fragments, and may present the fragments, and/or the completed file associated with the fragments, to the application.

Figure 6:
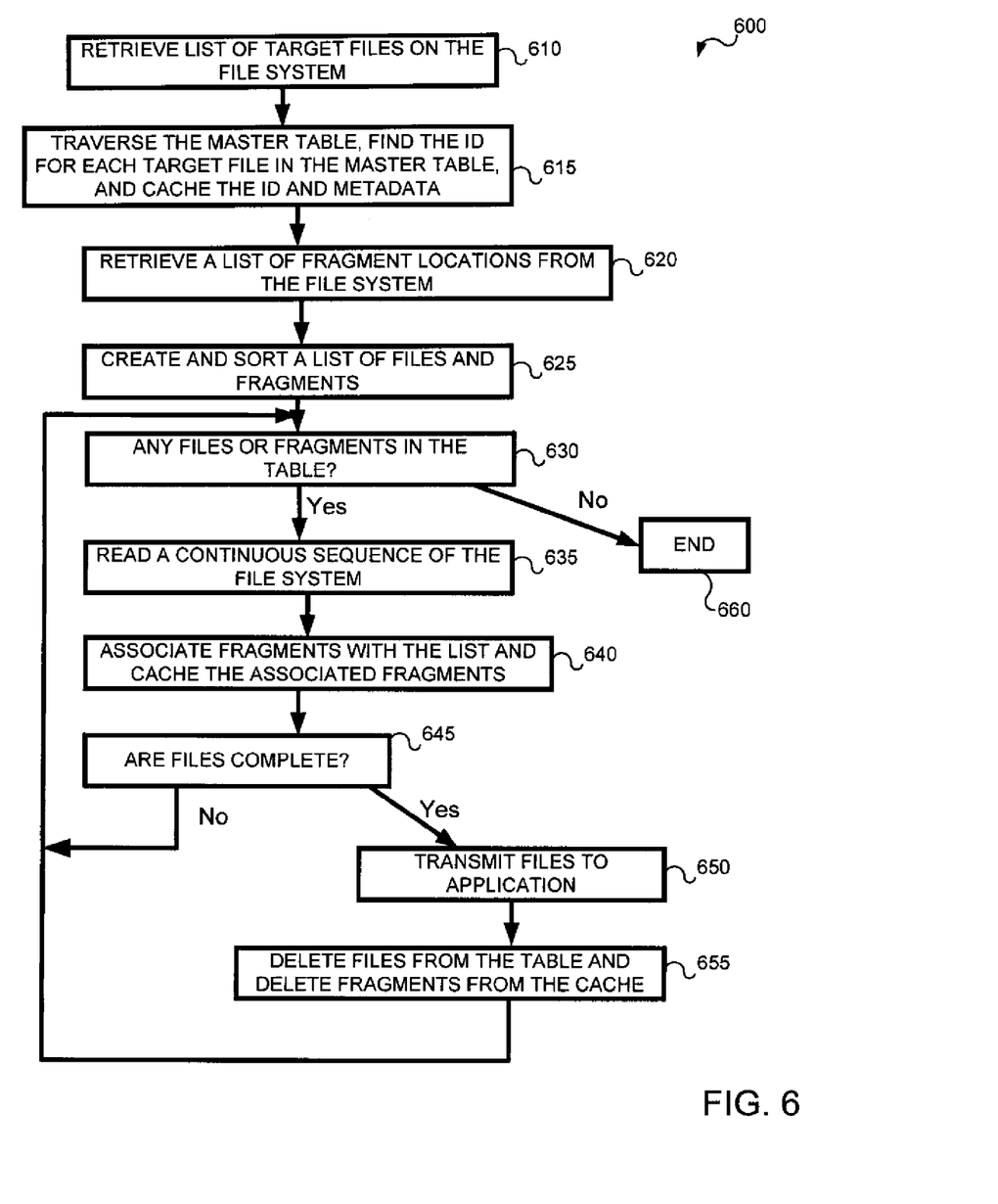
FIG. 6 shows a flow chart of a method for improved disk access through a filesystem in accordance with an embodiment of the present disclosure.

Turning now to FIG. 6, a flow chart of a method 600 for improved disk access through a filesystem is shown in accordance with an embodiment of the present disclosure. In step 610, a system is given or retrieves a set of one or more files to locate and present. The system may also be the volume cache driver, and may intercept read/write requests from an application. The application operating on the system or with access to the system may present a set of files. For example, an application that scans some or all of the files on the filesystem may present a list of files. The set may be in the form of one or more filename and path combinations, a request to find all files in a path, or another method of identifying files in a filesystem. In an alternate embodiment, the set of one or more files may comprise all or substantially all of the files on the filesystem.

In step 615, the system is operable to traverse the master file table. Methods of reading the master file table from the disk may vary depending on a type of disk and a file structure that the disk utilizes to store and recall files. In a New Technology File System ("NTFS")-formatted disk running Microsoft WINDOWS, for example, a list of files stored on the disk may be stored in a "master file table." The list of files may be associated with a file identifier and/or metadata in the master file table. The system may be operable to, for example, read the master file table directly in order to discover the list of files. The master file table may additionally comprise metadata associated with some or all of the files in the filesystem. The system is operable to read the metadata and the file identifiers from the master file table and cache the file identifiers and metadata in an accessible storage. For example, the system may cache the metadata and file identifiers in random access memory associated with the system. The method may cache the file identifiers and/or metadata for the files in the list of files from step 610, or may cache the file identifiers and/or metadata for some or all of the files in the filesystem.

In step 620, the system may retrieve a list of file fragment locations. In an NTFS-formatted disk, for example, the system may retrieve the list of file fragments from the master file table, and may retrieve the list of file fragments at the same time as the retrieval of the filesystem information in step 615. Alternatively, the system may determine a location of file fragments on the disk.

In step 625, the system may use the list of files stored on the filesystem and the location of file fragments to assemble a fragment table. The fragment table may sort the fragments based on their relative location, so that they are in an order relative to their position on the disk, and may include a pointer or other indexing system to relate the file fragments to the file it is a fragment of. For example, the list of file fragments may allow the system to assemble a maximum number of files with a minimum of non-continuous disk accesses. The fragment table may selectively list the list of files specified in step 610, or may list all files in the filesystem. Additionally, the fragment table may be a fixed size, or may be a variable size in order to accommodate the number of files in the filesystem or list of files.

In step 630, the system may parse the fragment table to determine if any files and/or file fragments exist in the list of files. If no files or file fragments exist, the method may end at step 660.

If files or file fragments exist in the fragment table, then the method 600 may proceed to step 635 wherein a continuous sequence of the disk may be read. A continuous sequence of a disk may be, using a rotating magnetic platter disk drive as an example, a single radius of the disk, or an area of the disk so that the disk reading device does not skip, but instead moves a minimum amount in order to find the next track of data. The system may start a process of reading from the disk at any position on the disk. The system, for example, may start at a first sector available on the disk, a last sector available on the disk, or at another point where the system determines that reading continuous areas of the disk may maximize assembly of files, or may be advantageous in any other way. An amount of data read from the disk may be a fixed amount of data set by software, hardware, or a user, or such amount may change from one iteration to the next. The amount of data read from the disk may also depend on an amount of memory available to the system.

In step 640, data contained within the file fragments in the continuous sequence of the disk may be associated with a file fragment in the fragment table. If one or more of the fragments is associated with a file specified in the set of files in step 610, the system may cache the file fragments, and associate it with the file. The caching of the file fragments may also be known as "prefetching." If a fragment of a file is read, and that file has no other fragments associated with it in the cache, the system may allocate enough memory in the cache for the entire file, and then associate the fragment to a portion of the file's allocated cache memory. If fragments for another file are also found in the disk read, or if the initial file cannot be assembled before the next disk read, the system may allocate memory for the other file as well.

Prefetching may be solved according to a constrained bin packing problem, so that a limited amount of memory may be used for prefetching operations, while maintaining performance similar to other solutions requiring a larger amount of memory. In one embodiment, the first fit algorithm may be used. Given the target file set, the first fit algorithm may consider the list of files in an order according to the location on the disk of the first fragment of the files contained within the list of files. For example, the prefetching algorithm may create one or more "buckets" of distinct amounts of memory to contain file fragments. The first fit algorithm may have access to the list of files, and may use information related to the file size and/or the number of fragments of the files in the list of files. The first fit algorithm may encounter a file fragment associated with one of the files in the list of files, and may read the overall file size from the list of files. If the overall file size is smaller than the amount of memory remaining in the first bucket, the first fit algorithm may place the file fragment in the first bucket. If the overall file size is larger than the amount of memory remaining in the first bucket, the first fit algorithm may place the file fragment in the second bucket, if the overall file size is smaller than the amount of memory remaining in the second bucket. If the overall file size is larger than the amount of memory remaining in the second bucket, the first fit algorithm may make similar determinations for the third bucket, the fourth bucket, and may continue until the overall file size is smaller than the amount of memory remaining in a bucket. If the first fit algorithm is unable to find a bucket where the overall file size is smaller than the amount of memory left in the bucket, the first fit algorithm may create a new bucket, and associate the bucket at the end of the number of buckets. In an alternate embodiment, the system may track the amount of memory remaining in each of the buckets, and the first fit algorithm may reduce the amount of memory available in a bucket by the overall file size of the file associated with the file fragment. When the file fragments of a file create a complete file, the first fit algorithm may operate with the method 600, or any of the other methods, to transmit the file to the requesting application. The method 600, or any of the other methods, may then delete the file from the bucket and may increase the amount of memory remaining in the bucket by the amount of the overall size of the file.

In an alternate embodiment, the first fit algorithm may be modified so that when a file fragment is added to a bin, the first fit algorithm may search for a bin where the available memory is greater to or equal to both the overall file size of the file associated with the file fragment, and also the overall file size of one or more consecutive files in the file list. The number of consecutive files may be static, or may be variable depending, for example, on the amount of memory available to the method and/or the amount of memory allocated to the method. The requirement to have memory allocated for both the file associated with the file fragment and also one or more additional files may be imposed if the bucket has been full recently, for example, in the last one, or two, or five or more passes. The requirement may also be imposed for each bucket, regardless if the bucket has been full recently.

In step 645, after a file fragment is added to the fragment table, the system may analyze the file associated with the added file fragment to see if the file is complete. If the file is not complete in the fragment table, the system may begin again at step 630 to associate another file fragment or file fragments with the fragment table. However, in step 650, if the file is complete in the fragment table, the system and/or the volume cache driver may transmit the file to an application requesting the file. For example, the system may transmit the file to an anti-virus software or other software for further analysis, or may transmit the file to backup software for storage on a backup system.

In step 655, the system then may delete the file from the list of files. The system may create an entry in the fragment table that the file has been transmitted, or the file and associated metadata may be deleted from the fragment table and/or cache. The system may associate all file fragments read in a continuous access of a disk into the fragment table before determining if any of the files associated with the file fragments are complete.

In other embodiments, the system may associate one or more file fragments at a time into the fragment table, and determine if the files associated with the one or more file fragments are complete. The system may then move the completed files to the application which requested the file. The system may utilize either method, depending on time, memory availability, or other factors.

If, during the operation of the method, another program requests a read or write from the disk, such that the read or write from the disk may disturb the continuous nature of the read requests from the method, the operating system and/or the filesystem may work to minimize the disturbance. This may be accomplished by, for example, caching the read or write request from the other program or attempting to re-sequence the read or write request so as to minimize the disturbance.

In an alternate embodiment, a method may be used to provide an analysis of segments of files or complete files, to determine if the segments have already been uploaded to a backup server. If the segments have not been uploaded to a backup server, then the method may upload the segments to the backup server and may associate the segments with one or more client computer systems. If the segments have been uploaded to a backup server, then the method may not upload the segments, but the backup server may note that a client computer system has a copy of the segments. The method may allow for faster and more efficient backup operations, and may reduce network transmission and disk storage demands associated with transmitting each file in each client to the backup server.

Figure 7:
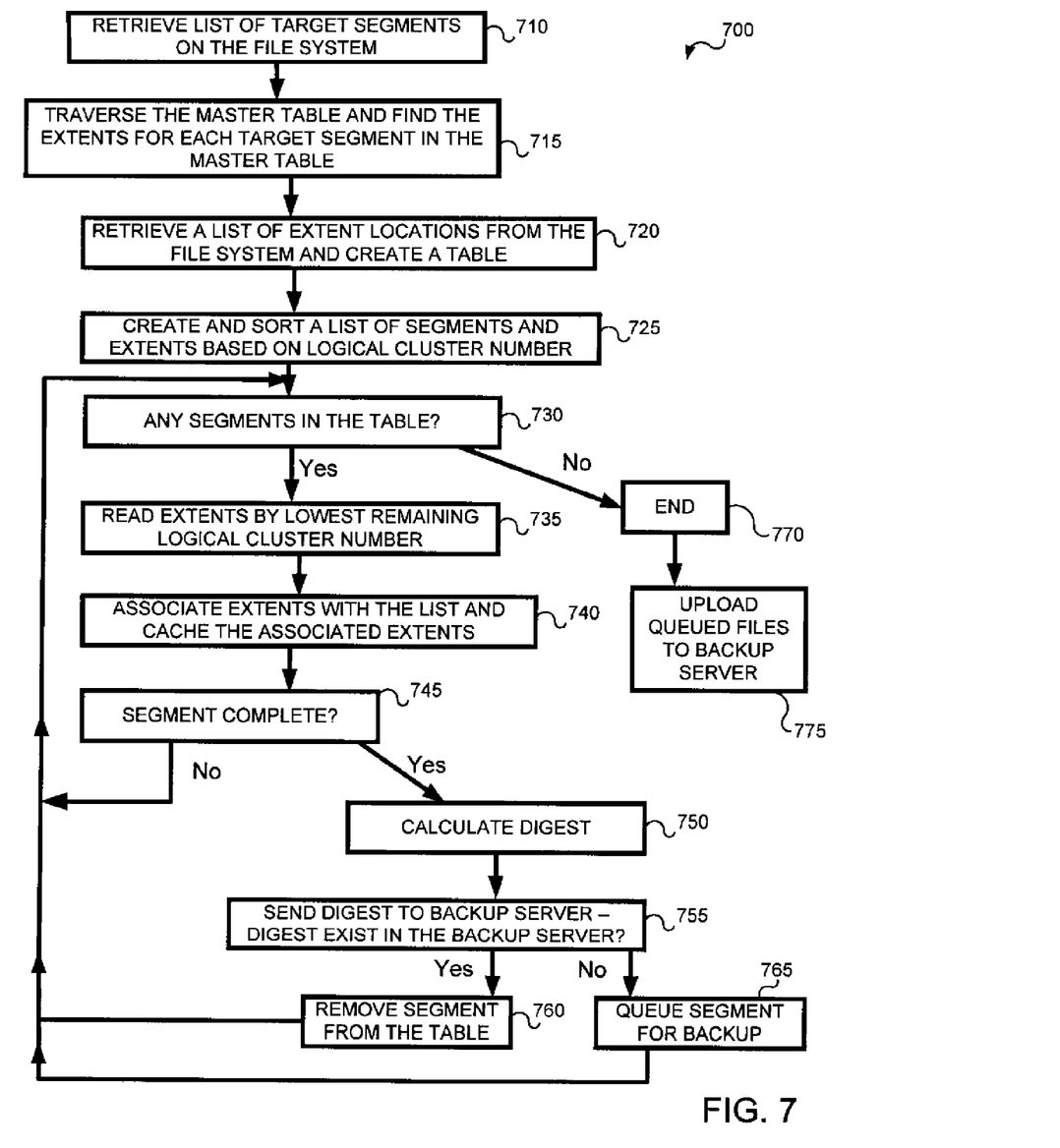
FIG. 7 shows a flow chart of a method for improved de-duplication analysis in accordance with an embodiment of the present disclosure.

Turning now to FIG. 7, a flow chart of a method 700 for improved de-duplication analysis is shown in accordance with an embodiment of the present disclosure. In step 710, a system is operable to read a filesystem from a disk. Methods of reading the filesystem from the disk may vary depending on a type of disk and a file structure that the disk utilizes to store and recall files. In a New Technology File System ("NTFS")-formatted disk running Microsoft WINDOWS, for example, a list of files stored on the disk may be stored in a master file table. The system may be operable to, for example, read the master file table directly in order to discover all of the files on the disk. Alternatively, the system may parse files and directories to find all files in a filesystem. The master file table may contain information about the files in the filesystem. For example, the master file table may contain a data attribute, which may contain the data of the file. If the file is larger than the data attribute maximum size, the filesystem may allocate additional areas or clusters for the additional data. The additional clusters may also be called extents or subsegments. The filesystem and/or the master file table may associate the extents to the data in the master file table by creating a mapping pair, matching an entry in the master file table, associated with a virtual cluster number, with one or more extents, associated with a logical cluster number.

In step 715, the system may retrieve a list of extents. In an NTFS-formatted disk, for example, the system may retrieve the list of extents from the associated mapping pairs of the master file table. Alternatively, the system may determine a location of file fragments on the disk.

In step 720, the system may retrieve the locations of the extents from the filesystem. The extents may be associated with the segment and/or an entry in the master file table by a mapping pair, and the extents may also be associated with a logical cluster number, a value associated with a relative position on a disk. For example, extents with logical cluster numbers of 100 and 101 may be in proximity to one another.

In step 725, the system may use the list of extents stored on the disk and the location of extents to assemble a fragment table. The fragment table may sort the extents based on their relative position (i.e., the associated logical cluster number), so that they are in an order relative to their disk location, and may include a pointer or other indexing system to relate the extents to the associated segment. For example, the fragment table may enable the system to assemble a maximum number of segments with a minimum of noncontinuous disk accesses. The fragment table may be a fixed size, or may be a variable size in order to accommodate the number of segments in the filesystem.

In step 730, the system may parse the fragment table to determine if any segments remain in the fragment table. If no segments exist, the method may end at step 770. If any segments are queued for uploading, as described below, the segments may be uploaded to the backup server in step 775. The backup server may associate the segments with the client that uploaded the segments.

If segments exist in the fragment table, then the method 700 may proceed to step 735 wherein a continuous sequence of the disk may be read. A continuous sequence of a disk may be, using a rotating magnetic platter disk drive as an example, a single radius of the disk, or an area of the disk so that the disk reading device does not skip, but instead moves a minimum amount in order to find the next track of data. The system may start a process of reading from the disk at any position on the disk. The system, for example, may start at a first sector available on the disk, a last sector available on the disk, or at another point where the system determines that reading continuous areas of the disk may maximize assembly of segments, or may be advantageous in any other way. An amount of data read from the disk may be a fixed amount of data set by software, hardware, or a user, or such amount may change from one iteration to the next. The amount of data read from the disk may also depend on an amount of memory available on the system. The extents may be read by the lowest logical cluster number, a value associated with the extent that shows the relative position of the extent on the disk. In an alternate embodiment, the extents may be read and/or ordered by highest logical cluster number, or may be ordered by another arrangement of logical cluster number.

In step 740, data contained within the file fragments in the continuous sequence of the disk may be associated with a file fragment in the fragment table. The extents in the fragment table found in the sequence may be cached by the system.

In step 745, after an extent is added to the fragment table, the system may analyze the segment associated with the added extent to see if the segment is complete. If the segment is not complete in the fragment table, the system may begin again at step 730 to associate another extent with the fragment table. However, in step 750, if the segment is complete in the fragment table, the system may calculate the digest of the segment. The digest may be, for example and without limitation, a hash of the segment.

The digest may be transmitted to the backup server in step 755. The backup server may analyze the digest, and determine if the digest is similar or identical to one or more digests associated with segments stored in the backup server. If the transmitted digest is similar or identical to one or more digests in the backup server, then the backup system may already have a copy of the segment. If the backup server does not need another copy of the segment, the backup server may note that the client has a copy of the segment, for example by associating the client name or other identifier with the segment, and may transmit a message to the system that the backup server does not require a copy of the segment. The system then removes the segment from the fragment table and continues to step 730 with additional segments, if any exist.

If the transmitted digest from step 755 does not match a digest in the backup server, then the segment may be a new segment to be transmitted to the backup server. The segment is queued for transmission in step 765. In an alternate embodiment, the segment is transmitted to the backup server without queuing the segment. The system then removes the segment from the fragment table and continues to step 730 with additional segments, if any exist.

The transmission of segments that the backup server does not already have reduces the number of segments that are transmitted, if duplicate segments exist over all of the clients that the backup server is associated with. For example, if client1 contains file A.dat, and an identical file A.dat exists on client2, client3, and client4, then only one copy of A.dat is stored in the backup server, reducing the overall memory and storage requirements of the backup server.

At this point it should be noted that optimizing disk access in accordance with the present disclosure as described above typically involves the processing of input data and the generation of output data to some extent. This input data processing and output data generation may be implemented in hardware or software. For example, specific electronic components may be employed in a computer or similar or related circuitry for implementing the functions associated with optimizing disk access in accordance with the present disclosure as described above. Alternatively, one or more processors operating in accordance with stored instructions may implement the functions associated with optimizing disk access in accordance with the present disclosure as described above. If such is the case, it is within the scope of the present disclosure that such instructions may be stored on one or more processor readable carriers (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system for optimizing disk access comprising:
a module for reading files in a filesystem, the files comprising two or more file fragments;
a module for determining a relative location of the two or more file fragments stored on a disk;
a module for creating a fragment table based upon a list of the files stored on the disk and the relative location of the two or more file fragments stored on the disk, wherein the fragment table is populated with a list of two or more of the files that are smaller than a specified size and fragments of one or more of the files that are larger than the specified size are excluded from the fragment table;
a module for sorting an index of the two or more file fragments on the disk in the fragment table according to the relative location of the two or more file fragments on the disk, using at least one computer processor, wherein sorting the index of the two or more file fragments according to the relative location of the file fragments on the disk comprises sorting a plurality of fragments from the two or more files populated in the list according to the relative location independent of which of the two or more files populated in the list the plurality of fragments are associated with;
a module for reading the two or more file fragments from the disk; and
a module for assembling one or more of the files from the two or more file fragments, wherein the one or more files are assembled using a fit algorithm using at least one of file size information and fragment information, wherein at least one of the one or more assembled files is transmitted to at least one of a backup application and an anti-virus application, and wherein the at least one of the one or more assembled files is deleted subsequent to transmission.

2. The system of claim 1, wherein the disk comprises a single physical disk.

3. The system of claim 1, wherein the disk comprises more than one physical disk.

4. The system of claim 1, wherein the size of the fragment table is variable.

5. The system of claim 1, wherein the size of the fragment table is fixed.

6. A method for optimizing disk access comprising:
reading files in a filesystem to optimize disk access, the files comprising two or more file fragments;
determining a relative location of the two or more file fragments stored on a disk;
creating a fragment table based upon a list of the files stored on the disk and the relative location of the two or more file fragments stored on the disk, wherein the fragment table is populated with a list of two or more of the files that are smaller than a specified size and fragments of one or more of the files that are larger than the specified size are excluded from the fragment table;
sorting, using at least one computer processor, an index of the two or more file fragments on the disk in the fragment table according to the relative location of the two or more file fragments, wherein sorting the index of the two or more fragments according to the relative location of the file fragments on the disk comprises sorting a plurality of fragments from the two or more files populated in the list according to the relative location independent of which of the two or more files populated in the list the plurality of fragments are associated with;
reading the two or more file fragments from the disk;
assembling one or more of the files from the two or more file fragments, wherein the one or more files are assembled using a fit algorithm using at least one of file size information and fragment information;
transmitting at least one of the one or more assembled files to at least one of a backup application and an anti-virus application; and
deleting the at least one of the one or more assembled files subsequent to transmission.

7. The method of claim 6, wherein the disk comprises a single physical disk.

8. The method of claim 6, wherein the disk comprises more than one physical disk.

9. The method of claim 6, wherein the size of the fragment table is variable.

10. The method of claim 6, wherein the size of the fragment table is fixed.

11. The method of claim 6, further comprising:
receiving a request for read access or write access to the disk;
determining that performing the request will disturb the reading of files in the file system to optimize disk access; and
minimizing the disturbance by performing at least one of: caching the request and attempting to re-sequence the request.

12. At least one non-transitory processor readable storage medium for storing a computer program of instructions configured to be readable by at least one processor for instructing the at least one processor to execute a computer process for performing the method as recited in claim 6.

13. An article of manufacture for optimizing disk access, the article of manufacture comprising:
at least one non-transitory processor readable storage medium; and
instructions carried on the at least one storage medium;
wherein the instructions are configured to be readable from the at least one storage medium by at least one processor and thereby cause the at least one processor to operate so as to:

read files in a filesystem, the files comprising two or more file fragments;
determine a relative location of the two or more file fragments stored on a disk;
create a fragment table based upon a list of the files stored on the disk and the relative location of the two or more file fragments stored on the disk, wherein the fragment table is populated with a list of two or more of the files that are smaller than a specified size and fragments of one or more of the files that are larger than the specified size are excluded from the fragment table;
sort an index of the two or more file fragments on the disk in the fragment table according to the relative location of the two or more file fragments on the disk, wherein sorting the index of the two or more file fragments according to the relative location of the file fragments on the disk comprises sorting a plurality of fragments from the two or more files populated in the list according to the relative location independent of which of the two or more files populated in the list the plurality of fragments are associated with;
read the two or more file fragments from the disk;
assemble one or more of the files from the two or more file fragments, wherein the one or more files are assembled using a fit algorithm using at least one of file size information and fragment information;
transmit at least one of the one or more assembled files to at least one of a backup application and an anti-virus application; and
delete the at least one of the one or more assembled files subsequent to transmission.

14. A method for optimizing disk access comprising:
reading file identifiers in a master table, the file identifiers associated with two or more files;
reading files in a filesystem, the files comprising two or more file fragments and associated with the file identifiers;
determining a relative location of the two or more file fragments stored on a disk;
creating a fragment table based upon a list of the files stored on the disk and the relative location of the two or more file fragments stored on the disk, wherein the fragment table is populated with a list of two or more of the files that are smaller than a specified size and fragments of one or more of the files that are larger than the specified size are excluded from the fragment table;
sorting, using at least one computer processor, an index of the two or more file fragments on the disk in the fragment table according to the relative location of the two or more file fragments, wherein sorting the index of the two or more file fragments according to the relative location of the file fragments on the disk comprises sorting a plurality of fragments from the two or more files populated in the list according to the relative location independent of which of the two or more files populated in the list the plurality of fragments are associated with;
reading the two or more file fragments from the disk;
assembling one or more of the files from the two or more file fragments, wherein the one or more files are assembled using a fit algorithm using at least one of file size information and fragment information;
transmitting at least one of the one or more assembled files to at least one of a backup application and an anti-virus application; and
deleting the at least one of the one or more assembled files subsequent to transmission.

15. The method of claim 14, further comprising a volume cache driver to receive read/write requests.

16. The method of claim 15, wherein the volume cache driver caches the two or more file fragments in a cache.

17. The method of claim 16, wherein the volume cache driver removes the one or more files from the cache after it is transmitted to an application.

18. A method for processing segments comprising:
reading segments in a filesystem, the segments comprising two or more subsegments;
determining a relative location of the two or more subsegments stored on a disk;
creating a fragment table based upon a list of the segments stored on the disk and the relative location of the two or more subsegments stored on the disk, wherein the fragment table is populated with a list of two or more of the segments that are smaller than a specified size and subsegments of one or more of the segments that are larger than the specified size are excluded from the fragment table;
sorting, using at least one computer processor, an index of the two or more subsegments on the disk in the fragment table according to the relative location of the two or more subsegments, wherein sorting the index of the two or more subsegments according to the relative location of the subsegments on the disk comprises sorting a plurality of subsegments from the two or more segments populated in the list according to the relative location independent of which of the two or more segments populated in the list the plurality of subsegments are associated with;
assembling one or more segments from the two or more subsegments, wherein the one or more segments are assembled using a fit algorithm using at least one of file size information and segment information;
transmitting a digest of the one or more segments to a system;
transmitting, to at least one of a backup application and an anti-virus application, the one or more segments based on an evaluation of the digest; and
deleting the at least one of the one or more assembled segments subsequent to transmission.

19. The method of claim 18, wherein the digest is transmitted to a backup application and the system is a backup server, the method further comprising:
determining that the digest is similar or identical to one or more digests at the backup server; and
noting, at the backup server, that a client has a copy of at least one of the one or more segments by associating a client identifier with the at least one of the one or more segments.

* * * * *